(12) United States Patent
Zhang et al.

(10) Patent No.: US 10,705,803 B2
(45) Date of Patent: Jul. 7, 2020

(54) METHOD AND SYSTEM FOR REALIZING DATA TRACKING BY MEANS OF SOFTWARE DEVELOPMENT KIT

(71) Applicant: Beijing Gaoyi Information Technology Co., Ltd., Beijing (CN)

(72) Inventors: Ximeng Zhang, Beijing (CN); Jiye Wu, Beijing (CN); Dingding Ye, Beijing (CN); Yuanming Shan, Beijing (CN); Jixin Zhang, Beijing (CN)

(73) Assignee: Beijing Gaoyi Information Technology Co., Ltd., Beijing (CN)

( * ) Notice: Subject to any disclaimer, the term of this patent is extended or adjusted under 35 U.S.C. 154(b) by 278 days.

(21) Appl. No.: 15/751,997

(22) PCT Filed: Aug. 11, 2016

(86) PCT No.: PCT/CN2016/094686
§ 371 (c)(1),
(2) Date: Feb. 12, 2018

(87) PCT Pub. No.: WO2017/025056
PCT Pub. Date: Feb. 16, 2017

(65) Prior Publication Data
US 2020/0097259 A1  Mar. 26, 2020

(30) Foreign Application Priority Data
Aug. 12, 2015 (CN) .......................... 2015 1 0497873

(51) Int. Cl.
*G06F 8/30* (2018.01)
*G06F 11/34* (2006.01)
*G06F 11/30* (2006.01)

(52) U.S. Cl.
CPC .............. *G06F 8/30* (2013.01); *G06F 11/302* (2013.01); *G06F 11/3495* (2013.01)

(58) Field of Classification Search
CPC ....................................................... G06F 8/30
(Continued)

(56) References Cited

U.S. PATENT DOCUMENTS 7,707,249 B2 * 4/2010 Spataro ................. H04L 65/403
709/205
8,788,617 B2 * 7/2014 Cardozo ............... G06F 16/955
709/217

(Continued)

FOREIGN PATENT DOCUMENTS

CN 1768368 A 5/2006
CN 104424232 3/2015

(Continued)

*Primary Examiner* — John Q Chavis
(74) *Attorney, Agent, or Firm* — Fox Rothschild LLP

(57) ABSTRACT

A method and system for realizing data tracking by means of a software development kit, wherein the method comprises: allocating an identifier for an element in a webpage or an application program, via a software development kit, so that the identifier can identify the element in the webpage or the application program; and when the element is triggered, sending the identifier corresponding to the element to a cloud-end server, so that the cloud-end server can acquire the triggered element according to the received identifier. Therefore, the method and system for realizing data tracking by means of a software development kit can avoid manual data tracking, greatly improve the efficiency of data tracking and free up a large amount of time for engineers, thereby saving human resource costs. In addition, the automation of the data definition management realizes automatic and efficient data management as well as version control.

11 Claims, 8 Drawing Sheets

(58) Field of Classification Search
USPC .......................................................... 717/106
See application file for complete search history.

(56) References Cited

U.S. PATENT DOCUMENTS

| | | | | |
|---|---|---|---|---|
| 8,799,862 | B2* | 8/2014 | Adamson | G06F 11/3664 |
| | | | | 717/102 |
| 9,665,349 | B2* | 5/2017 | Savage | G06F 9/451 |
| 2010/0333116 | A1* | 12/2010 | Prahlad | G06F 3/0649 |
| | | | | 719/328 |
| 2013/0080910 | A1* | 3/2013 | Bingell | G06F 3/048 |
| | | | | 715/744 |
| 2013/0311420 | A1* | 11/2013 | Tehranchi | G06Q 30/018 |
| | | | | 707/608 |
| 2015/0143504 | A1* | 5/2015 | Desai | H04L 45/14 |
| | | | | 726/13 |
| 2015/0180836 | A1* | 6/2015 | Wong | G06Q 20/32 |
| | | | | 713/172 |

FOREIGN PATENT DOCUMENTS

| | | | |
|---|---|---|---|
| CN | 104462319 | A | 3/2015 |
| CN | 105630512 | A | 6/2016 |
| WO | 03075172 | A1 | 9/2003 |

* cited by examiner

METHOD AND SYSTEM FOR REALIZING DATA TRACKING BY MEANS OF SOFTWARE DEVELOPMENT KIT

CROSS REFERENCE TO RELATED APPLICATIONS

This application is a national stage application of, and claims priority to, International Patent Application No. PCT/CN2016/094686, filed Aug. 11, 2016, which claims priority to Chinese Patent Application No. 201510497873.2, filed Aug. 12, 2015, the disclosures of which are fully incorporated by reference in full.

BACKGROUND

A method and system for realizing data tracking by means of a software development kit, wherein the method comprises: allocating an identifier for an element in a webpage or an application program, via a software development kit, so that the identifier can identify the element in the webpage or the application program; and when the element is triggered, sending the identifier corresponding to the element to a cloud-end server (120), so that the cloud-end server (120) can acquire the triggered element according to the received identifier. Therefore, the method and system for realizing data tracking by means of a software development kit can avoid manual data tracking, greatly improve the efficiency of data tracking and free up a large amount of time for engineers, thereby saving human resource costs. In addition, the automation of the data definition management realizes automatic and efficient data management as well as version control.

TECHNICAL FIELD

The present invention relates to a data processing field, in particular to a method and system for realizing data tracking by means of a software development kit (SDK).

SUMMARY

The SDK, which is a development tool for building an application software for specific software packages, software frameworks, hardware platforms, operating systems, etc., is generally used for providing an application programming interface (API) for the programming language. The current technical solution for the data tracking of a webpage or an APP by the SDK, there is usually a need for engineers' manual tracking. Specifically, the engineers install the SDK, and then call the API provided by the SDK for every data that needs to be tracked, and manually input a project code, i.e., tracking. For example, when there is a need to track a login button of a homepage, the engineers need to embed an event handling function at a corresponding position. When there is a need to make statistics of page access data on the application, the engineers would need to call onPageStart and onPageEnd functions at entry and exit positions of each page.

Obviously, the existing solution could be time and energy consuming for the engineers to input codes at various positions to implement the data tracking. The data tracking is realized with an extremely low efficiency and a lot of human resources are wasted. Further, in the case where products are rapidly developed and iterated, a lot of data definitions need to be amended in time, which causes, more severely, even lower working efficiency and more human resource will be wasted, moreover, the timeliness of data will be difficult to secure, and prone to errors. In addition, the data tracking is realized by the engineers, but the definition and demand for data usually come from business departments, such as marketing, sales, strategic and product departments. Nevertheless, the existing data tracking mode separates the business definition from the engineering realization so that the communication cost between different departments is largely increased, which is unfavorable to an increase of the working efficiency.

SUMMARY

In view of this, the technical problem of how to provide a method and system for realizing data tracking by means of the SDK with increasing data tracking efficiency and reducing the human resource cost.

In order to solve the above technical problem, according to one embodiment of the present invention, in a first aspect, a method for realizing data tracking by means of a software development kit is provided, comprising: allocating an identifier for an element in a webpage or an application program by a software development kit, so that the identifier can position the element in the webpage or the application program; and sending the identifier corresponding to the element to a cloud-end server, when the element is triggered, so that the cloud-end server can acquire the triggered element according to the received identifier.

In one embodiment of the present application, allocating the identifier for the element in the webpage or the application program by a software development kit so that the identifier can position the element in the webpage or the application program, further comprises: automatically allocating the identifier for each element in the webpage or the application program according to attributes of the element by the software development kit, and the identifier being capable of uniquely identifying the element in the webpage or the application program; wherein the attributes of the element include uniform resource locator URL, category, package, control, nested structure, label structure, element order, text content and identification number ID.

In another embodiment of the present application, before the element is triggered, it further comprises: establishing and saving of a preset label, and the corresponding relations between the preset label, the identifier as well as the element by the cloud-end server.

In another embodiment of the present application, after establishing and saving—the preset label, and the corresponding relations between the preset label, the identifier and the element by the cloud-end server, the method further comprises: acquiring the element and the preset label corresponding to the received identifier based on the corresponding relations through the received identifier by the cloud-end server.

In another embodiment of the present application, the corresponding relations are mapping relations, and when the mapping relations change, the cloud-end server establishes new mapping relations.

In order to solve the above technical problem, according to another embodiment of the present invention, in a second aspect, a system for realizing data tracking by means of a software development kit is provided, comprising: a terminal provided with a software development kit and equipped with a software development kit interface, wherein the terminal allocates, by the software development kit, an identifier for an element in a webpage or an application program, so that the identifier can position the element in the webpage or the application program; and a cloud-end server connected to the terminal via a network, provided with a software development kit and equipped with a software development kit interface, wherein when the element is triggered, the cloud-end server receives the identifier corresponding to the element, and acquires the triggered element according to the received identifier.

In another embodiment of the present invention, the terminal automatically allocates the identifier for each element in the webpage or the application program according to attributes of the element via the software development kit, and the identifier being capable of uniquely positioning the element in the webpage or the application program; wherein the attributes of the element include uniform resource locator URL, category, package, control, nested structure, label structure, element order, text content and identification number ID.

In another embodiment of the present invention, before the element is triggered, the cloud-end server establishes and saves a preset label, and the corresponding relations between the preset label, the identifier as well as the element.

In another embodiment of the present invention, after establishing and saving the preset label, and corresponding relations between the preset label, the identifier and the element, the cloud-end server is further used for acquiring, through the received identifier, the element and the preset label corresponding to the received identifier based on the corresponding relations.

In another embodiment of the present invention, the corresponding relations are mapping relations, and when the mapping relations change, the cloud-end server establishes new mapping relations.

The advantageous effects of the present invention include:

The method for realizing data tracking by means of the SDK, as provided by the present invention, allocates an identifier for an element in a webpage or an application program via the SDK, and sends, when the element is triggered, the identifier corresponding to the element to a cloud-end server, so that the cloud-end server can acquire the triggered element according to the received identifier, thereby avoiding the manual data tracking, thus greatly improving the efficiency of data tracking and freeing up a large amount of time for engineers so as to save human resource costs. In addition, automatic and efficient data management and version control are realized through automatic management of data definition.

The method for realizing data tracking by means of the SDK, as provided by the present invention, establishes and saves corresponding relations between the element, the identifier and the preset label. The cloud-end server, matches the preset label with the received identifiers based on the corresponding relations, so that business people can directly define required data, integrate product experience with data analysis, increase the efficiency of data management and enhance the consistency of requirement and implementation.

The method for realizing data tracking by means of the SDK, as provided by the present invention, establishes, when the mapping relations change, new mapping relations by the cloud-end server, replaces the original mapping relations with the new mapping relations and keeps the original mapping relations on file to provide good version control and historical retrospection for changes of data definition, and thus is suitable for rapidly iterated products and products having many functional details.

According to the following detailed description about exemplary embodiments with reference to figures, the other features and aspects of the present invention will become clear.

BRIEF DESCRIPTION OF THE DRAWINGS

The figures, which are included in the Description and constitute a part of the Description, show, together with the Description, exemplary embodiments, features and aspects of the present invention, and are used for explaining the principles of the present invention.

DETAILED DESCRIPTION

Hereinafter, the various exemplary embodiments, features and aspects of the present invention will be elaborated with reference to the figures. The same reference signs in the figures indicate elements having the same or similar functions. Although various aspects of the embodiments are shown in the figures, the figures need not be drawn to scale unless otherwise specified.

Herein, the special word "exemplary" means "serving as an example or embodiment or illustrative". Any embodiments illustrated as "exemplary" ones herein need not be construed as being superior to or better than other embodiments.

Moreover, in order to explain the present invention better, numerous specific details are given in the following specific embodiments. Those skilled in the art should understand that, without some specific details, the present invention can also be carried out. The embodiments of the present invention can be typically applied to apps, intelligent hardwares, in-company or third-party data systems and the like of platforms such as a web network, Android and the mobile operating system iOS of Apple Inc. In some examples, methods, means and elements well known to those skilled in the art are not elaborated for the convenience of highlighting the subject of the present invention.

Figure 1:
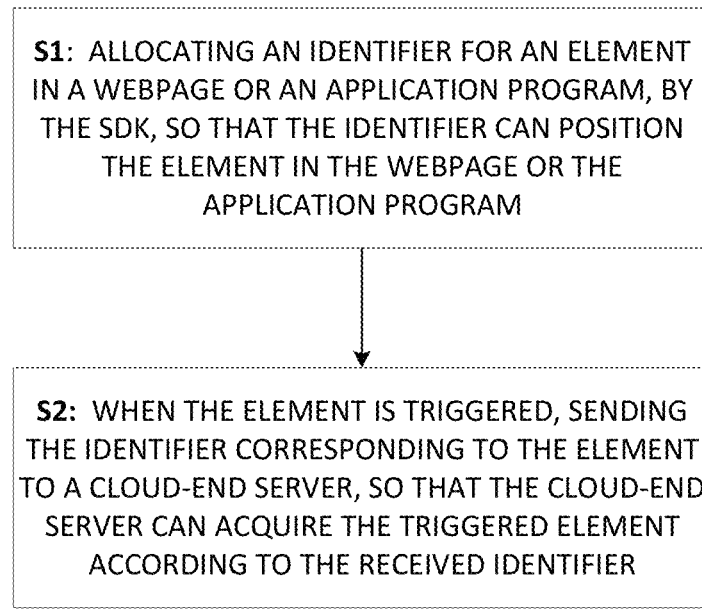
FIG. 1 shows a flow diagram of a method for realizing data tracking by means of the SDK according to one embodiment of the present invention.

FIG. 1 shows a flow diagram of a method for realizing data tracking by means of the SDK according to one embodiment of the present invention. As shown in FIG. 1, the method comprises:

Step S1: allocating an identifier for an element in a webpage or an application program by the SDK, so that the identifier can position the element in the webpage or the application program.

The SDK is used in labeling each element in the webpage (web) or the application program (app). This labeling comprises automatically allocating an identifier for each element in the web or app page according to attributes of the element, such as uniform resource locator URL, category, package, control, nested structure, label structure, element order, text content and ID. Wherein each identifier can uniquely identify an element on the page, for example, a whole page (a home page, a paid page or the like) and a button (an add button or a sort button and a side advertising column or the like) in the web.

Step S2: when the element is triggered, sending the identifier corresponding to the element to a cloud-end server, so that the cloud-end server can acquire the triggered element according to the received identifier. The identifier is used to identify the element, the element itself is an object, and when the element is triggered, information, such as subject (user), time and position, is passed onto the server.

Thus, the cloud-end server can automatically track data contents including the followings, without having to make manual tracking by engineers, thereby saving the human resource cost and improving the efficiency of data tracking.

Object including: the elements or the pages in a web app or a native app;

Action including: the gestures such as browse, click, scroll and slide;

Who, i.e., Subject, including: user ID;

When including: time and time zone;

Location including: position information, country, city or more accurate GPS;

Other Collectable Information including: device information, operating system, version number, voice, video, text, etc.

Figure 2:
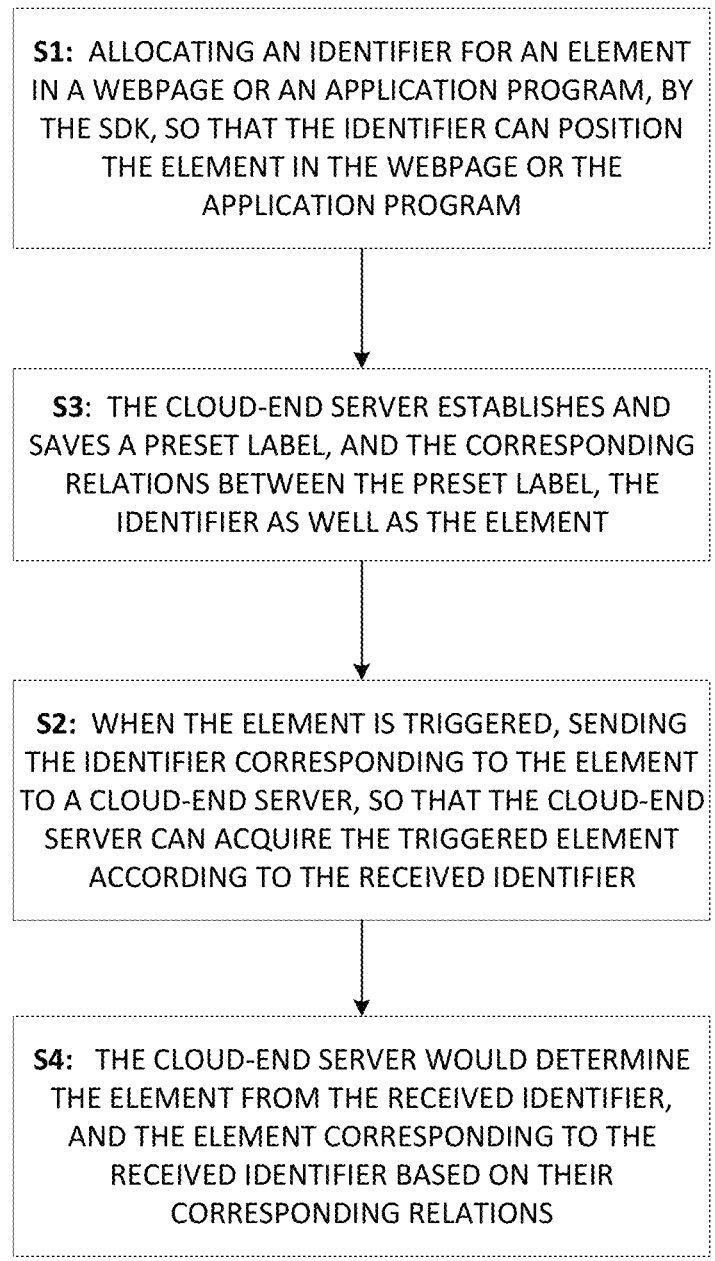
FIG. 2 shows a flow diagram of the method for realizing data tracking by means of the SDK according to another embodiment of the present invention.

In a possible realization of the present invention, as shown in FIG. 2, before the element is triggered, the method further comprises Step S3: the cloud-end server establishes and saves a preset label, and the corresponding relations between the preset label, the identifier as well as the element. After the element is triggered, the method further comprises Step S4: The cloud-end server would determine the element, from the received identifier, and the element corresponding to the received identifier based on their corresponding relations, and then matching and displaying the corresponding preset label to the operating personnel, that preset label is friendly and easily understood.

Figure 3:
FIG. 3 shows a schematic diagram of performing Step S3, at the time of loading an enterprise website, in another embodiment of the present invention.

Specifically, a data collector, for example, an enterprise user logs in a cloud application, and loads up a web site or an app of the enterprise, then the user enters the edit mode. In such a mode, the user selects a required element or a page, and then sets a preset label thereof. The edit mode also includes naming (i.e., a preset label) and storing an intuitive and easily understandable name for the element or the page. As shown in FIG. 3, for example, naming "search result-product list" for the element or page. The cloud-end server establishes and stores the corresponding relations between the preset label, the element and the identifier. Further, the cloud-end server can acquire, through the received identifier, the element and the preset label corresponding to the received identifier based on the corresponding relations, so that the enterprise user can directly see a visual element, to which each label corresponds, on web and app products, and can also sort, search, filter and combine all the labels on a management page. The whole process does not require engineers to write codes manually, it is direct and intuitive, what you see is what you get, the result could be obtained by dragging, circling and pointing the mouse. The resulting operations are simple and clear, help to improve the working efficiency and reduce the human resource cost, so that the staff at the business end can directly define and obtain data.

In another embodiment of present invention, when the labeled name or mapping relation is changed, the cloud-end server establishes a new corresponding relation and keeps the old one on file. In this way, every time the defined details change, a corresponding snapshot is generated, so that a historical change of the data can be managed automatically.

Figure 4:
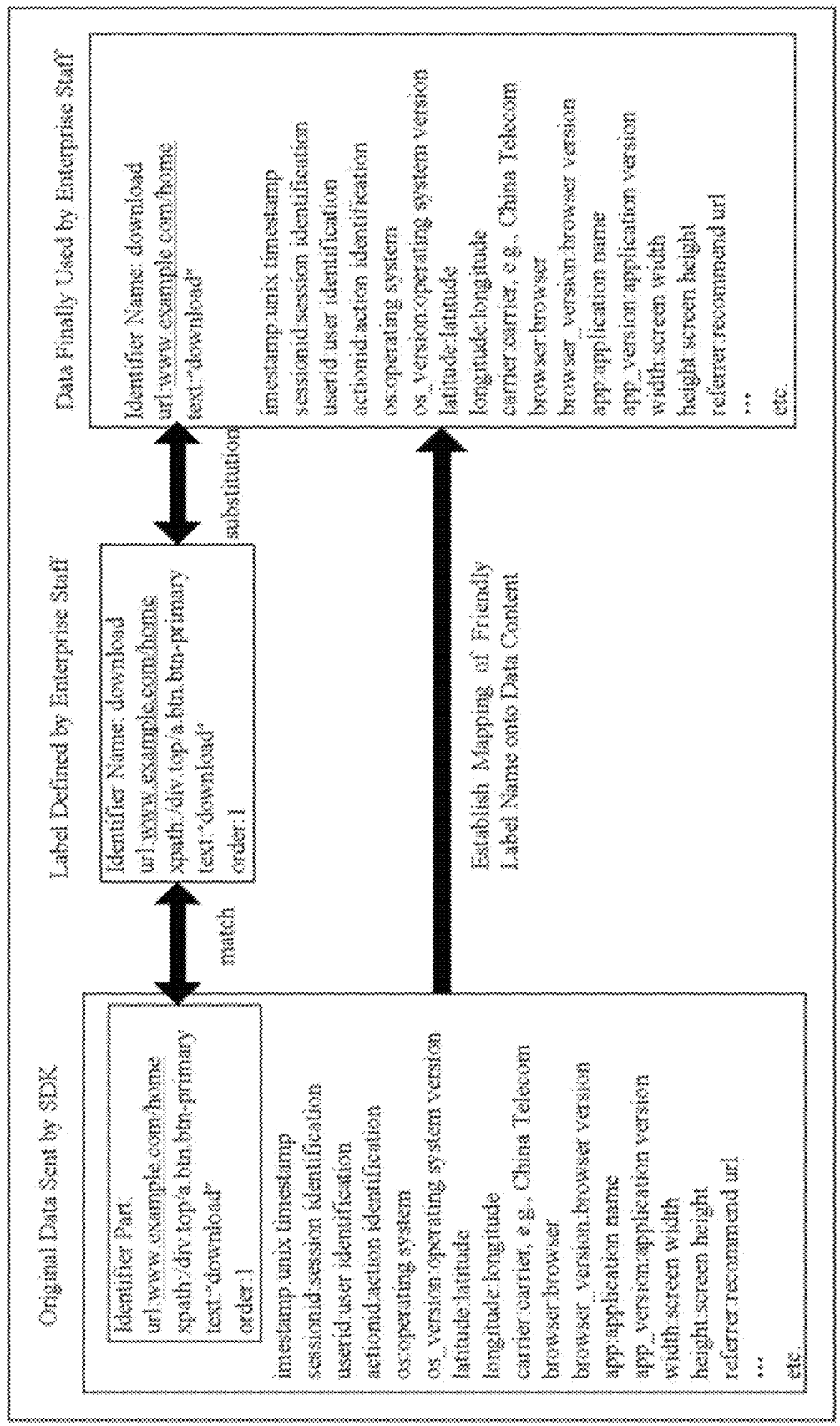
FIG. 4 shows a schematic diagram, in which the cloud-end server performs conversion between an identifier and a label based on a corresponding relation.

As shown in FIG. 4 of the drawing, when the element of the web or app is triggered, the cloud-end server can perform automatic conversion between the identifier and the label based on the corresponding relation. The identifier corresponding to the element can be changed for a simple and easily understandable label defined by the enterprise user. The cloud-end server can obtain the triggered element information (e.g., time, location, person, action and object) through the label, thus, learn the operation performed by the tracked object on the corresponding page element. The essential parts of a web end identifier include: URL, xpath, displayed text content, and sequence number of elements under the same page xpath structure.

Among them, URL: identify page level content, for example, http://www.example com/test?a=1, mainly including: protocol, sub-domain, domain, path and query.

xpath: identify elements in the page, for example, /div.class1/div.class2/table#id1/span, mainly including: HTML labels, such as body, div, table, span, a, button and form, as well as attributes of the HTML labels, such as id, class, name, data-, href and src.

The displayed text content includes, for example, "log-in", "register" and "confirm".

The sequence number of the same page xpath is mainly used to differentiate sibling nodes.

Besides, the essential parts of the App end identifier include: App package name, page class name, xpath and displayed text content, mainly including:

The App package name is mainly used to identify apps, e.g., com.testapp.stage1.

The page class name is mainly used to identify pages, e.g., HomeViewController.

The xpath is mainly used to identify page elements, including sequence number at the same time, e.g., UIWindow/UILayoutContainerView#0/UIView#3/UILabel#0.

The displayed text content includes, for example, "log-in", "register" and "confirm".

Figure 5:
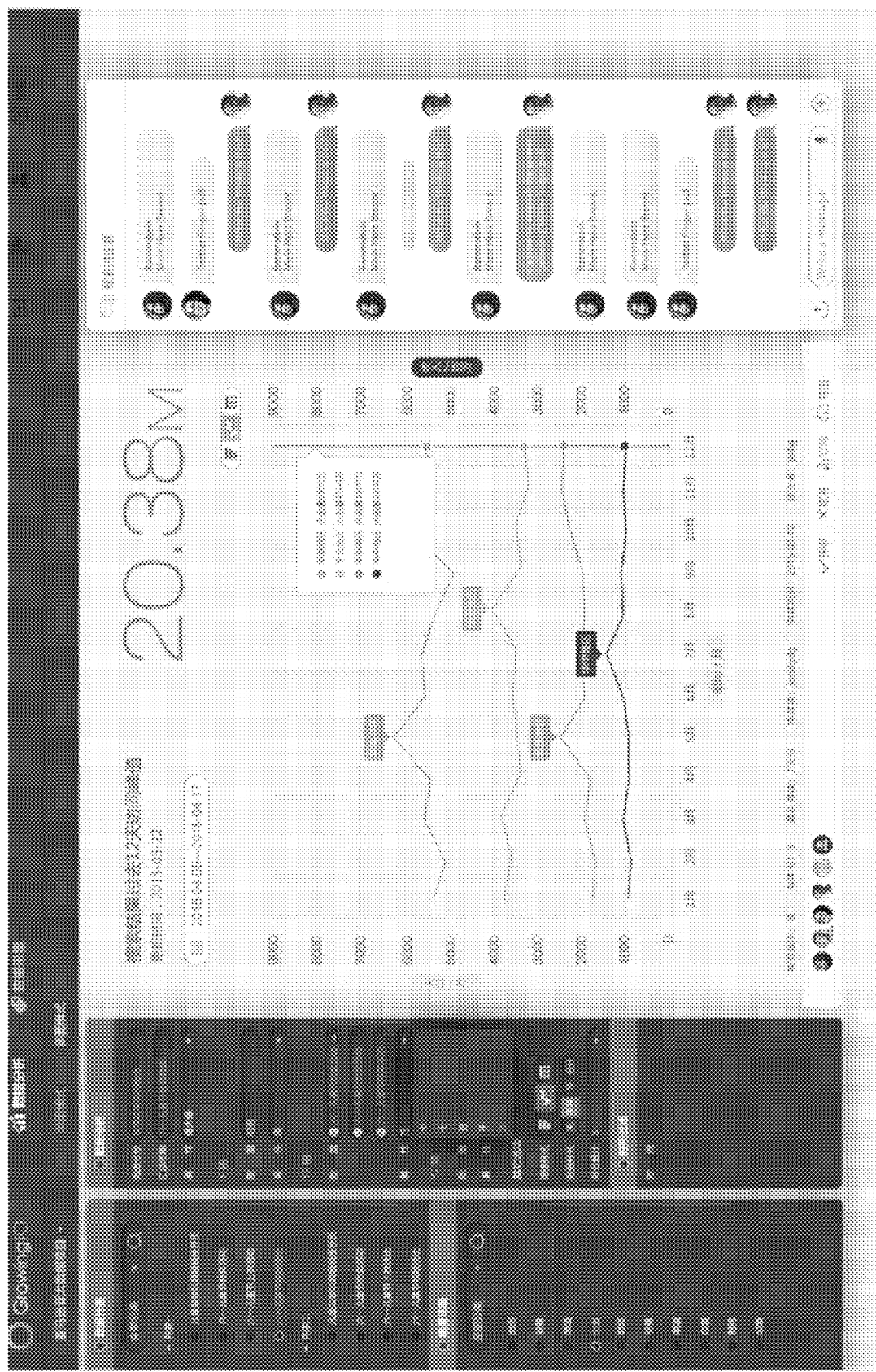
FIG. 5 shows a schematic diagram of using the label for charting.

Furthermore, as shown in FIG. 5, the enterprise user can also drag the defined label to a charting module with the mouse for generating various analytical charts so as to judge a trend and an abnormity.

Figure 6:
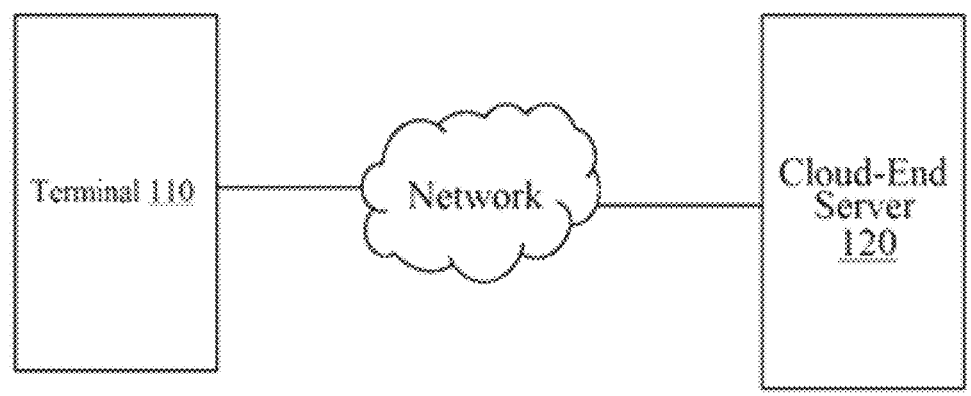
FIG. 6 shows a structural schematic diagram of a system for realizing data tracking by means of the SDK according to one embodiment of the present invention.

FIG. 6 shows a system for realizing data tracking by means of the SDK according to one embodiment of the present invention. As shown in FIG. 6, the system 100 comprises: a terminal 110 and a cloud-end server 120.

In the system, the terminal 110 is provided with an SDK and SDK API. The said terminal 110 allocates identifiers for the elements in a webpage or an application program, so that the identifier can identify the element in the webpage or the application program. The details of how to allocate and identify are described in Step S1, which will not be repeated here.

The cloud-end server 120 is connected to the terminal 110 via a network, provided with an SDK and equipped with an SDK interface, wherein when the element is triggered, the cloud-end server 120 receives the identifier corresponding to the element, and acquires the triggered element according to the received identifier. The acquisition of triggered is described in Step S2, which will not be repeated here.

In another embodiment of the present invention, the terminal 110 automatically allocates, via the SDK, the identifier for each element in the webpage or the application program according to attributes of the element, the identifier being capable of uniquely identifying an element in the webpage or the application program, wherein the attributes of the element include uniform resource locator URL, category, package, control, nested structure, label structure, element order, text content and identification number ID.

In another embodiment of the present invention, before the element is triggered, the cloud-end server 120 establishes and saves a preset label, and the corresponding relations between the preset label, the identifier as well as the element. It further acquires, through the received identifier, the element and the preset label corresponding to the received identifier based on the corresponding relations. The procedures for the above actions are described in Steps S3-S4, which will not be repeated here.

In another embodiment of the present invention, the corresponding relations are mapping relations, and when the mapping relations change, the cloud-end server 120 establishes new mapping relations and keeps the original mapping relations on file.

Various component embodiments of the present invention can be realized with hardwares, or software modules running on one or more processors, or combinations thereof. Those skilled in the art should understand that a microprocessor or a digital signal processor (DSP) can be used in practice to realize some or all functions of some or all components in the system for realizing data tracking by means of a software development kit according to one embodiment of the present invention. The present invention can also be implemented as some or all equipment or device programs (e.g., a computer program and a computer program product) for executing the method described herein. Such programs implementing the present invention can be stored on a computer readable medium, or can have the form of one or more signals. Such signals can be downloaded and obtained from Internet sites, or provided on carrier signals, or provided in any other forms.

Figure 7:
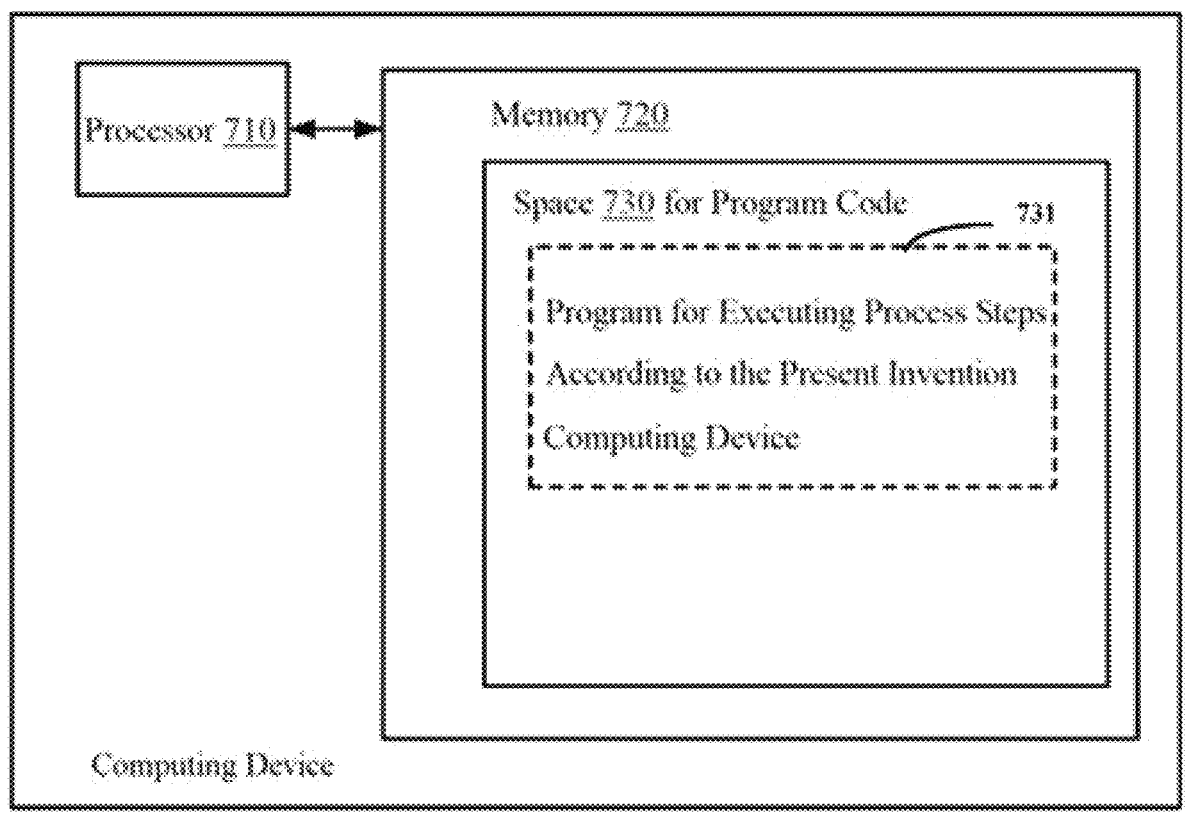
FIG. 7 schematically shows a block diagram of a computing device for executing the method for realizing data tracking by means of the SDK according to the present invention.
Figure 8:
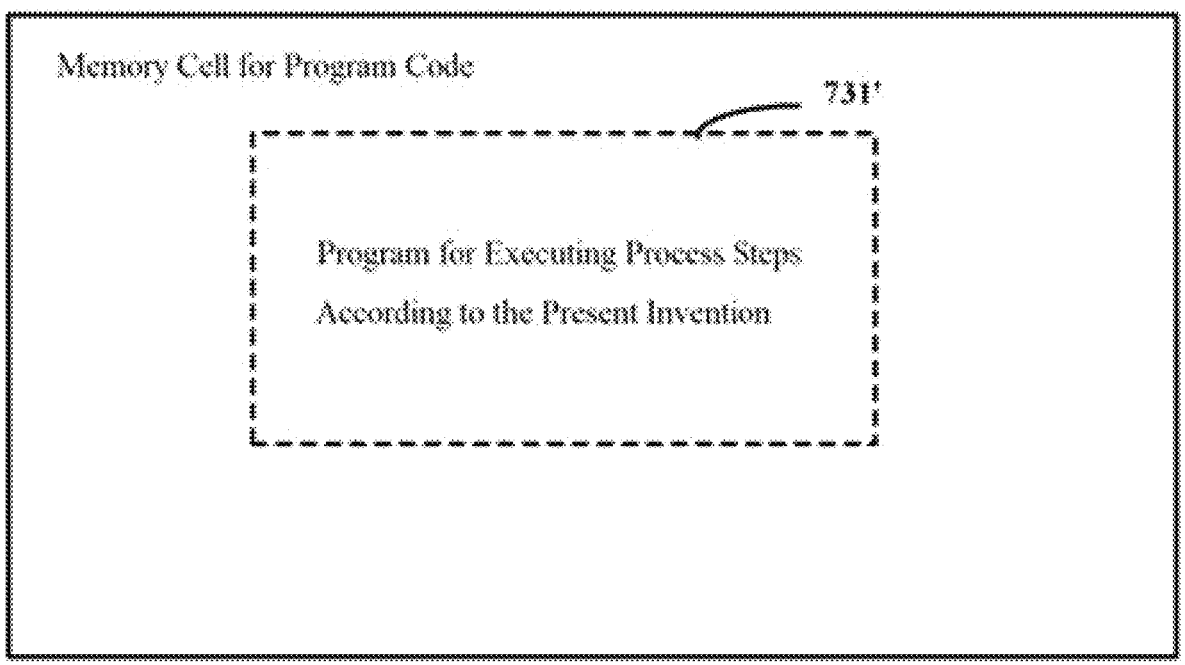
FIG. 8 schematically shows a memory cell for keeping or carrying a program code that realizes the method for realizing data tracking by means of the SDK according to the present invention.

For example, FIG. 7 shows a computing device that can realize the method for realizing data tracking by means of a software development kit. The computing device traditionally comprises a processor 710 and a computer program product in the form of a memory 720 or a computer readable medium. The memory 720 may be an electronic memory such as flash memory, EEPROM (Electrically Erasable Programmable Read-Only Memory), EPROM, hard disk or ROM. The memory 720 has a storage space 730 of a program code 731 for executing any process step in the above method. For example, the storage space 730 for the program code can include various program codes 731 respectively used for implementing various steps in the above method. These program codes can be read from one or more computer program products or written to such one or more computer program products. These computer program products include program code carriers such as hard disks, compact discs (CD), storage cards or floppy disks. Such computer program products are usually portable or fixed memory cells according to FIG. 8. These memory cells can have a storage segment, a storage space and the like, which are arranged similarly to the memory 720 in the computing device of FIG. 7. The program codes can be compressed, for example, in an appropriate form. In general, the memory cell comprises computer readable codes 731', i.e., codes that can be read by a processor such as 710, and these codes, when run by the computing device, cause the computing device to perform various steps in the method described above.

What are mentioned above are only specific embodiments of the present invention, but the scope of protection of the present invention is not limited thereto. Any changes or substitutions readily conceivable to the technical personnel familiar with the present technical field, within the technical scope disclosed by the present invention, should be covered within the scope of protection of the present invention. Therefore, the scope of protection of the present invention should be determined by the scopes of protection of the claims.

The invention claimed is:

1. A method for realizing data tracking by means of a software development kit, comprising:
   allocating an identifier for an element in a webpage or an application program via the software development kit, so that the identifier can identify the element in the webpage or the application program, including:
      automatically allocating the identifier for each element in the webpage or the application program according to attributes of the element by the software development kit, and the identifier being capable of uniquely identifying the element in the webpage or the application program; and
   sending the identifier corresponding to the element to a cloud-end server when the element is triggered, so that the cloud-end server can acquire the triggered element according to the received identifier,
   wherein the attributes of the element include uniform resource locator URL, category, package, control, nested structure, label structure, element order, text content and identification number ID.

2. The method for realizing data tracking by means of a software development kit according to claim 1, wherein, before the element is triggered, the method further comprises:
   establishing and saving a preset label, and the corresponding relations between the preset label, the identifier as well as the element by the cloud-end server.

3. The method for realizing data tracking by means of a software development kit according to claim 2, wherein, after establishing and saving the preset label, and the corresponding relations between the preset label, the identifier as well as the element by the cloud-end server, the method further comprises:
   acquiring the element and the preset label corresponding to the received identifier based on the corresponding relations, through the received identifier by the cloud-end server.

4. The method for realizing data tracking by means of a software development kit according to claim 3, wherein the corresponding relations are mapping relations, and when the mapping relations change, the cloud-end server establishes new mapping relations.

5. A system for realizing data tracking by means of a software development kit, comprising:
   a terminal provided with a software development kit and equipped with a software development kit interface, wherein the terminal allocates, by the software development kit, an identifier for an element in a webpage or an application program, so that the identifier can identify the element in the webpage or the application program,
  wherein the terminal automatically allocates, by the software development kit, the identifier for each element in the webpage or the application program according to attributes of the element, the identifier being capable of uniquely identifying an element in the webpage or the application program; and
a cloud-end server connected to the terminal via a network, provided with a software development kit and equipped with a software development kit interface, wherein when the element is triggered, the cloud-end server receives the identifier corresponding to the element, and acquires the triggered element according to the received identifier,
  wherein the attributes of the element include uniform resource locator URL, category, package, control, nested structure, label structure, element order, text content and identification number ID.

6. The system for realizing data tracking by means of a software development kit according to claim 5, wherein, before the element is triggered, the cloud-end server establishes and saves a preset label, and corresponding relations between the preset label, the identifier as well as the element.

7. The system for realizing data tracking by means of a software development kit according to claim 6, wherein, after establishing and saving a preset label, and corresponding relations between the preset label, the identifier and the element, the cloud-end server is further used for acquiring, through the received identifier, the element and the preset label corresponding to the received identifier based on the corresponding relations.

8. The system for realizing data tracking by means of a software development kit according to claim 7, wherein the corresponding relations are mapping relations, and when the mapping relations change, the cloud-end server establishes new mapping relations.

9. A non-transitory computer-readable medium containing programming instructions that are configured to cause a computing device to realize data tracking by means of a software development kit by:
  allocating an identifier for an element in a webpage or an application program via a software development kit, so that the identifier can identify the element in the webpage or the application program, including instructions to:
    automatically allocate the identifier for each element in the webpage or the application program according to attributes of the element by the software development kit, and the identifier being capable of uniquely identifying the element in the webpage or the application program; and
  sending the identifier corresponding to the element to a cloud-end server when the element is triggered, so that the cloud-end server can acquire the triggered element according to the received identifier,
  wherein the attributes of the element include uniform resource locator URL, category, package, control, nested structure, label structure, element order, text content and identification number ID.

10. The non-transitory computer-readable medium according to claim 9, further comprising additional programming instructions stored on a computer-readable medium and configured to, before the element is triggered, cause the cloud-end server to:
  establish and save a preset label, the corresponding relations between the preset label, the identifier and the element.

11. The non-transitory computer-readable medium according to claim 10, wherein:
  the corresponding relations are mapping relations, and
  further comprising additional programming instructions stored on a computer readable medium and configured to cause, when the mapping relations change, the cloud-end server to establish new mapping relations.

* * * * *